No. 879,590. PATENTED FEB. 18, 1908.
A. ROTH.
DOUGH MIXING MACHINE.
APPLICATION FILED APR. 19, 1907.

Witnesses
C. M. Fahnestock
R. P. Hoyt

Inventor
Anton Roth
by Alfred M. Allen
Attorney

UNITED STATES PATENT OFFICE.

ANTON ROTH, OF NEWPORT, KENTUCKY.

DOUGH-MIXING MACHINE.

No. 879,590.  Specification of Letters Patent.  Patented Feb. 18, 1908.

Application filed April 19, 1907. Serial No. 369,157.

*To all whom it may concern:*

Be it known that I, ANTON ROTH, a citizen of the United States, residing in Newport, county of Campbell, and State of Kentucky, have invented certain new and useful Improvements in Dough-Mixing Machines, of which the following is a full, clear, and exact description, reference being had to the accompanying drawings, forming part of this specification.

My invention relates to machines for the mechanically beating up and mixing of batches of dough, more particularly for cakes, sweet goods, and the like, and the particular object of the invention is to furnish a certain novel construction of agitator or beater for thoroughly mixing and stirring the ingredients, as will be hereinafter particularly pointed out and claimed.

Figure 1:
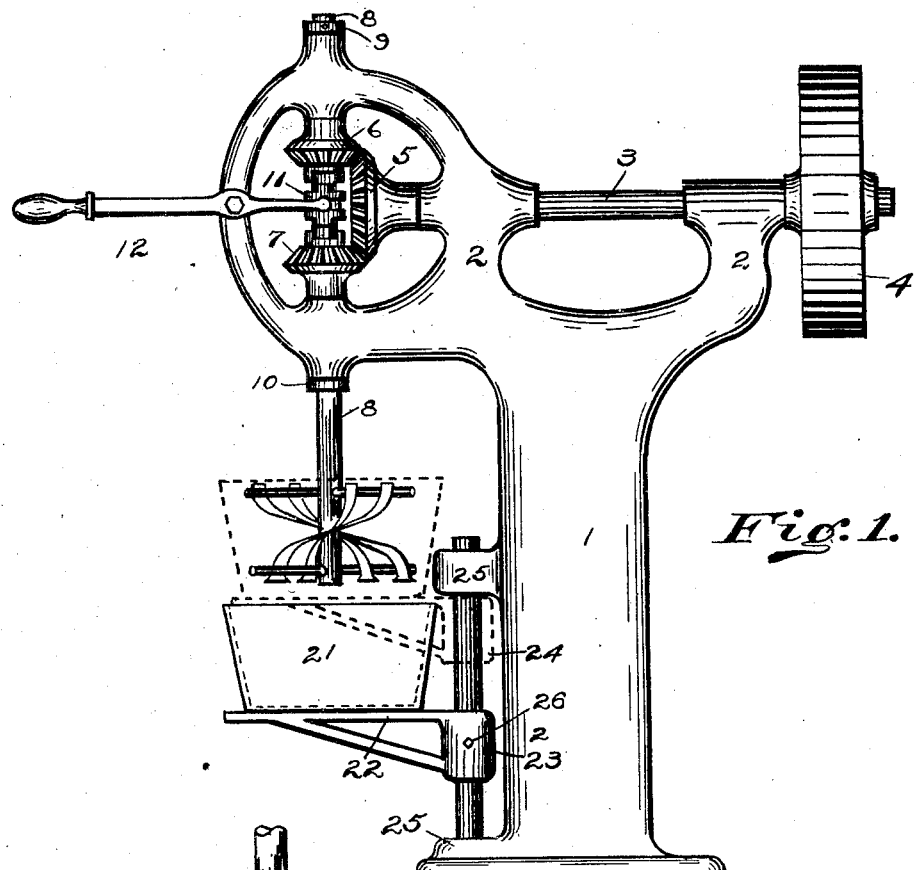
Figure 2:
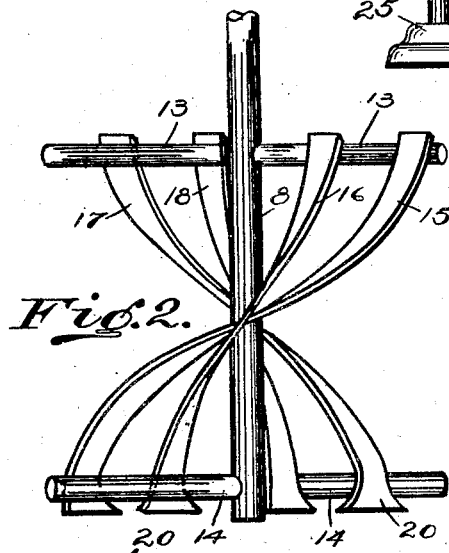
Figure 3:
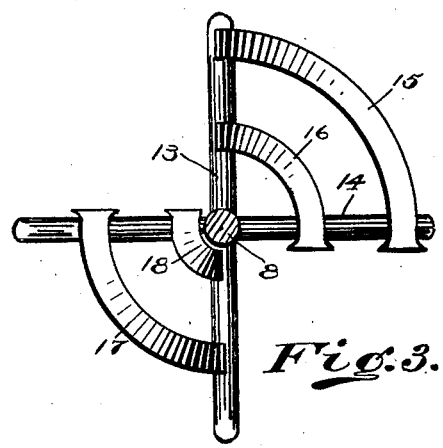

In the drawings Figure 1 is a side elevation of my improved machine. Fig. 2 is a perspective view of the agitator, Fig. 3 is a plan of same.

The operating mechanism is mounted on the substantial standard 1, provided with arms 2—2, in which is journaled in suitable bearings the driving shaft 3, provided at one end with the driving pulley 4. The other end of this driving shaft 3, outside the journal bearing carries the beveled gear 5, which meshes with the beveled gears 6 and 7, mounted loosely on the vertical shaft 8, journaled in a suitable extension of the standard and held in position by the collars 9 and 10. Between the gears 6 and 7 is the clutch collar 11 secured to the shaft by spline and groove, and this collar is shifted by the hand lever 12 to engage either of the gears 6 and 7 to rotate the shaft 8 in either direction in the wellknown way. The lower end of the shaft 8 is provided with the agitator for thoroughly beating up the dough mixture.

Secured on the shaft a convenient distance apart for the depth of the dough receptacle at right angles to the axis of the shaft, and in planes at right angles to each other are the bars or rods 13 and 14, and secured to the bars and extending from the upper to the lower bar are the pairs of blades 15, 16 and 17, 18. These blades are bent spirally and the two pairs of blades are arranged in alternate positions, so that one pair will contact with the dough mixture between the spaces left by the other pair. The blade 15, for example, extends spirally from the end of one bar 13 to the end of the other bar 14. The other blade 16 of the pair extends from a point about midway between the bar 15 and the shaft 8, to a corresponding point on the bar 14, while the other pair of blades 17 and 18 occupy positions intermediate of the blades 15 and 16 on the opposite portions of the bars 13 and 14. The lower ends of the blades 15, 16, 17 and 18 extend a short distance below the bar 14, and at the base are broadened out, as shown at 20, so at the bottom the blades will sweep over and scrape the entire bottom surface of the receptacle.

21 is the dough receptacle of cylindrical shape, and mounted and secured in fixed position, in any well known way on the adjustable shelf 22, which shelf is carried by the collar 23 mounted on the shaft 24 secured in lugs 25 on the main standard 1.

When the ingredients are placed in the receptacle 21, the table 22 is raised to bring the agitator within the receptacle, and the table is then locked in position by the set screw 26. The agitator shaft is then rotated as above described, usually in a direction to cause the spirality of the blades to carry the material, while agitating and beating it to the bottom of the receptacle. It may often be of advantage, however, to beat up the mixture by raising it from the bottom, and in that event, the shaft is rotated in the opposite direction, thus raising the ingredients and allowing them to drop back around the agitator.

Having thus described my invention, what I claim as new, and desire to secure by Letters Patent, is:—

In a dough mixing machine, the combination, with a receptacle, of an agitator therefor, with means for rotating same, said agitator comprising four spiral blades arranged on opposite portions of the agitator shaft, each of said blades of the several pairs being secured at different distances from the axis of the shaft, one pair operating on the spaces left by the other pair, the lower ends of said blades being extended downwards and broadened out to completely scrape the bottom of the receptacle.

ANTON ROTH.

Witnesses:
SAM HARRIS,
GLENA PRITCHARD.